United States Patent
Sato

[11] Patent Number: 5,340,151
[45] Date of Patent: Aug. 23, 1994

[54] AIR BAG APPARATUS
[75] Inventor: Koki Sato, Aichi, Japan
[73] Assignee: Kabushiki Kaisha Tokai-Rika-Denki-Seisakusho, Aichi, Japan
[21] Appl. No.: 978,377
[22] Filed: Nov. 18, 1992
[30] Foreign Application Priority Data
Nov. 25, 1991 [JP] Japan ................... 3-096443
[51] Int. Cl.⁵ .............................. B60R 21/20
[52] U.S. Cl. ................. 280/743 R; 280/728 R; 280/730 A
[58] Field of Search ........... 280/743 R, 728 R, 730 A, 280/728 A

[56] References Cited
U.S. PATENT DOCUMENTS
5,193,847  3/1993  Nakayama ................ 280/743

FOREIGN PATENT DOCUMENTS
57-56923  2/1982  Japan .
2-169344  6/1990  Japan .................... 280/743
2123444  10/1990 Japan .
2143249  12/1990 Japan .
492737   3/1992  Japan .
2220620  1/1990  United Kingdom .......... 280/730 A
9118760  12/1991 World Int. Prop. O. ........ 280/728

Primary Examiner—Eric Culbreth
Attorney, Agent, or Firm—Sixbey, Freidman, Leedom & Ferguson

[57] ABSTRACT

In an air bag apparatus, a bag body has a bag body opening portion. The bag body opening portion communicates with a gas generating apparatus for generating gas when a vehicle rapidly decelerates. Further, the bag body is expanded by gas generated from the gas generating apparatus. A base plate holds a peripheral edge of the bag body opening portion. A plurality of reinforcing materials is superposed in layered fashion on the peripheral edge of the bag body opening portion to reinforce the bag body. One portion is held by a base member. The plurality of reinforcing materials are respectively sewn to the reinforcing materials contacting the bag body.

19 Claims, 3 Drawing Sheets

AIR BAG APPARATUS

BACKGROUND OF THE INVENTION

1. Field of the Invention

The present invention relates to an air bag apparatus which expands a bag body on the lateral side of an occupant when a vehicle decelerates rapidly.

2. Description of the Related Art

In an air bag apparatus, a peripheral edge of an opening portion of a bag body is secured to a metallic base by rivets or the like. An inflator passing through the metal base is provided with a gas injection portion which is arranged in the opening portion of the bag body.

When a vehicle rapidly decelerates, gas is injected from the gas injection portion of the inflator so that the bag body can expands by pressure caused by the gas toward an occupant.

Concerning the expansion of the bag body, the peripheral edge of the opening portion of the bag body is secured to the metallic plate, and extension is restricted. It is possible to freely extend a position on the outside of the opening portion with respect to the opening portion peripheral edge of the bag body. In the bag body, large load is applied to a boundary portion between the freely extending position and the restrictively extending position.

In well-known air bag apparatus, in order to reduce the load exerting on the boundary portion, a plurality of reinforcing materials are superposed at the peripheral edge of the opening portion of the bag body. Further, the plurality of reinforcing materials are sewn on the bag body at the same position (at one point) on the outside of the opening portion with respect to the opening portion peripheral edge of the bag body.

However, in the air bag apparatus, tensile strength applied to the bag body is uniformly distributed and the respective reinforcing material since the plurality of reinforcing material are sewn on the bag body at the same position (at one point) as set forth above. The tensile strength applied to the bag body is equal to $1/(N+1)$ of tensile strength at a time when there is no reinforcing material. Accordingly, it is not ensured that the tensile strength can be efficiently distributed by the reinforcing material.

SUMMARY OF THE INVENTION

In view of the facts set forth above, it is an object of the present invention to provide an air bag apparatus which can efficiently distribute force applied to a bag body by using a reinforcing material.

The air bag apparatus of the present invention is provided with a gas generating means for generating gas when a vehicle rapidly decelerates, a bag body having a bag body opening portion which communicates with the gas generating means and is expanded by the gas generated from the gas generating means, a base member for holding a peripheral edge of the opening portion of the bag body, and a plurality of reinforcing materials superposed in a layered fashion on the peripheral edge of the opening portion of the bag body to reinforce the bag body, one portion being held by the base member, the plurality of reinforcing materials being respectively sewn to the reinforcing materials contacting the bag body.

According to the present invention constructed as set forth above, in the air bag apparatus, gas is generated from the gas generating apparatus when the vehicle rapidly decelerates. Consequently, the bag body is expanded by the pressure of the generated gas. The bag body is fixed to the base member at extension restricting positions at which extension is restricted. Positions provided apart from the extension restricting positions extend freely when the bag body is expanded. A large strength is applied to the boundary portion between these positions. However, the plurality of reinforcing materials is respectively sewn to the reinforcing materials respectively contacting the bag body. Thus, the tensile strength applied to the bag body becomes $(\frac{1}{2}^N) \times F$ where N is the number of the reinforcing materials, and F is the tensile strength applied to the bag body when there is no reinforcing material. Therefore, the tensile strength can be efficiently distributed by the reinforcing materials. If N reinforcing materials are sewn at the same position (one point) of the bag body as in the prior art, the tensile strength applied to the bag body is equal to $\{1/(N+1)\} \times F$. In the prior art, the degree of distribution of the tensile strength by the reinforcing materials is extremely low as compared with the present invention.

Since the present invention is constructed as set forth above, it is possible to obtain an excellent effect in that the strength applied to the bag body can be efficiently distributed by the reinforcing material.

DESCRIPTION OF THE PREFERRED EMBODIMENTS

A description will be given of one embodiments of an air bag apparatus of the present invention, which is adapted to a side door of a front-passenger seat with reference to FIGS. 1 to 3.

In these drawings, the arrow marked UP shows the upward direction of a vehicle, the arrow marked IN shows the inward direction of the vehicle, and the arrow marked FR shows the forward direction of the vehicle, respectively. As shown in FIG. 1 illustrating a first embodiment of the present invention, a side door 10 is provided with an inner panel 12. The inner panel 12 is provided with a base plate 21.

Figure 1:
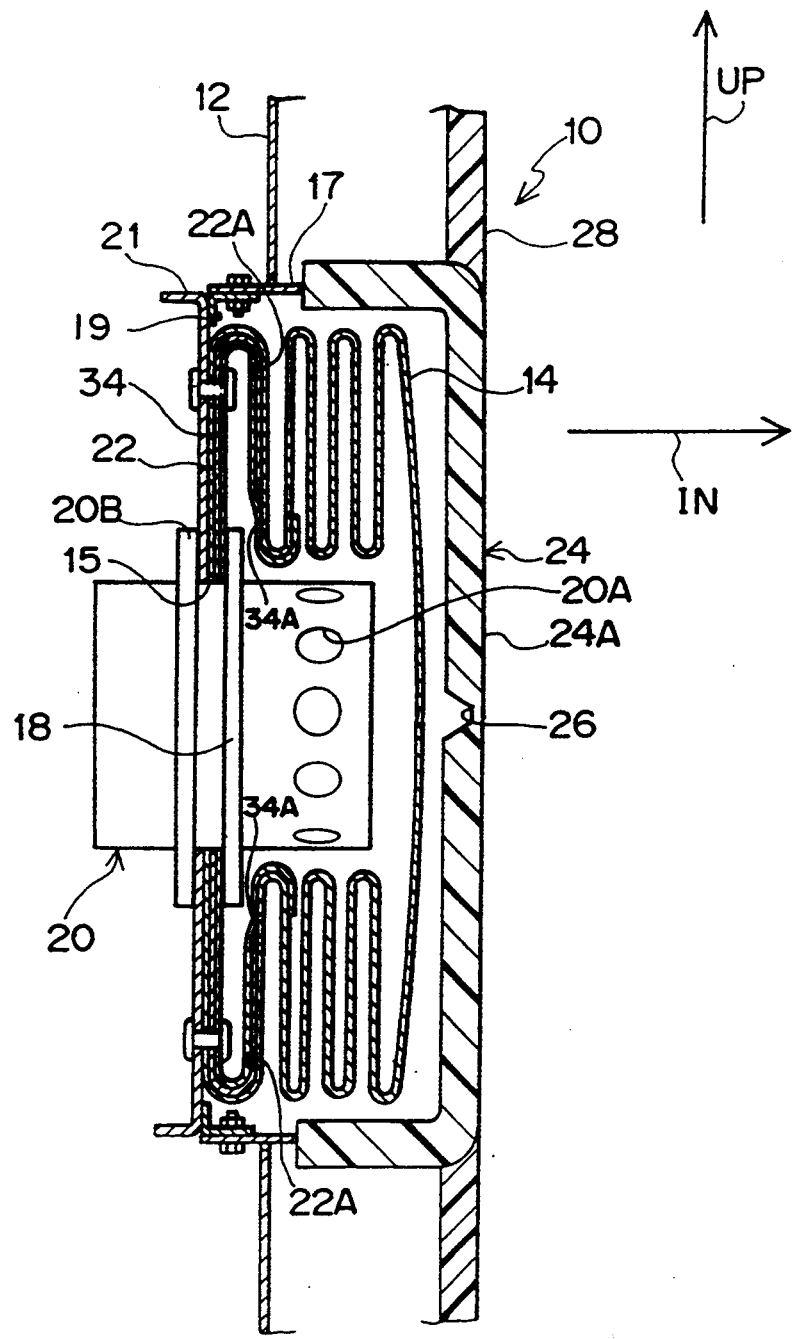
FIG. 1 is a sectional view of an air bag apparatus of a first embodiment of the present invention illustrating a condition where a side door accommodates said air bag apparatus.
Figure 2:
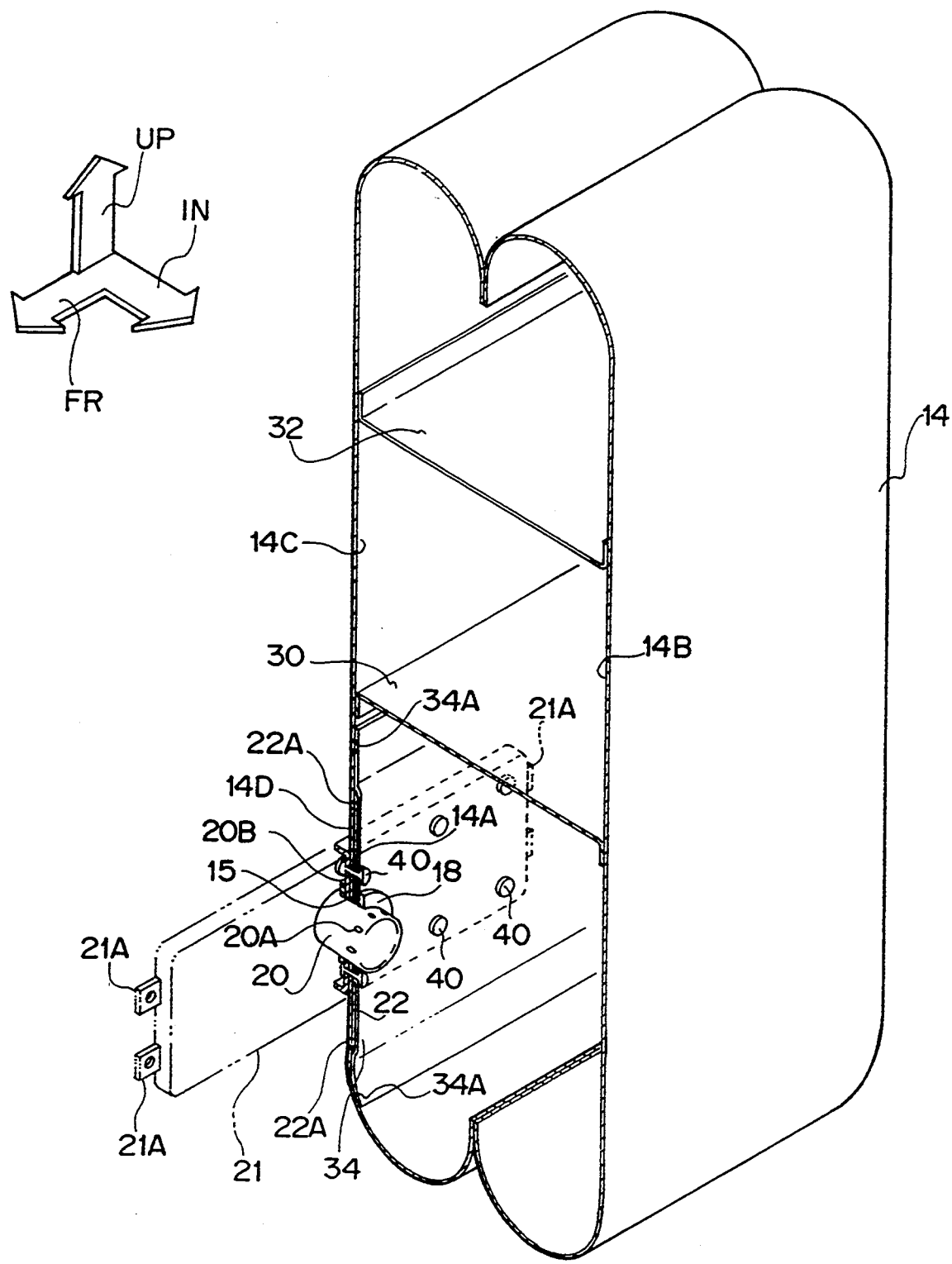
FIG. 2 is a perspective view of the air bag apparatus of a second embodiment of the present invention as it appears after the air bag apparatus has been activated.

As is also shown in FIG. 2 illustrating a second embodiment of the present invention, the base plate 21 is substantially rectangular-shaped so that its elongated length in the backward and forward directions of the vehicle. Mounting flanges 21A are provided in the vicinity of four corners of the base plate 21. The base plate 21 is secured to the inner panel 12 shown in FIG. 1 via the mounting flanges 21 by unillustrated bolts and nuts. An air bag body 14 and a substantially cylindrical inflator 20 serving as a gas generating means are provided on the base plate 21.

The inflator 20 is arranged so as to pass through the base plate 21, an opening portion 15 of the air bag body 14, reinforcing material 22, and reinforcing material 34, in that order, in the direction from a flange 20B toward a front-seat passenger. Further, gas holes 20A are arranged in the air bag apparatus. The flange 20B is in contact to a surface opposite to a surface of the base plate 21 on the side of the front-seat passenger. In all, the inflator 20 passes through the flange 20B, the base plate 21, the air bag body 14, and as shown in FIG. 3, the reinforcing material 22 and the reinforcing material 34. Further, the inflator 20 is secured to the base plate 21 by unillustrated bolts and nuts.

An unillustrated starting system, an unillustrated detonator, and an unillustrated booster are arranged in the inflator 20. Unillustrated gas generating material is disposed on outer peripheries of the starting system, the detonator and the booster. The starting system is provided with an unillustrated sensor, for detecting a collision of the vehicle or deformation of the side door 10, and an ignition pin. The ignition pin is always loaded in a direction for colliding with the detonator. Normally (i.e., at times other than when the vehicle rapidly decelerates), the movement of the ignition pin is blocked so as to be separated from the detonator. When the sensor detects the collision of the vehicle or the deformation of the side door 10, the ignition pin is released from being blocked so that the ignition pin can collide with the detonator so as to activate the detonator.

As shown in FIG. 1, the air bag cover 24 is secured to the base plate 21 via a core bar 17 which is mounted on a bracket 19 which in turn is secured to the base plate 21. The air bag cover 24 is disposed on the front-seat passenger side of the base plate 21. The air bag body 14 is accommodated between the air bag cover 24 and the base plate 21. A thin-walled portion 26 is provided at a substantially intermediate portion of a top surface 24A of the air bag cover 24. Accordingly, it is easy to break the air bag cover 24 at the thin-walled portion 26. The top surface 24A is coplanar with a door trim 28 which is provided on the front-seat passenger side of the inner panel 12.

The air bag body 14 is provided in the condition that the air bag body 14 is folded on the front-seat passenger side with respect to the base plate 21 (i.e., in the direction of the arrow marked IN). As shown in FIG. 2, the air bag body 14 is provided with rectangular retaining materials 30, 32. The retaining materials 30, 32 have one ends sewn to an inner wall 14B which is disposed on the side of the air bag body 14 nearest the vehicle cabin. Further, the retaining materials 30, 32 have the other ends sewn to an inner wall 14C which is disposed on the side of the base plate 21. In FIG. 2, where the air bag body 14 is expanded, the retaining material 30 is disposed at a substantially intermediate portion (above the inflator 20 in the direction of UP) of the air bag body 14. Further, the retaining material 32 is disposed above the retaining material 30 at an upper direction of the air bag body 14 in the UP direction. That is, the two retaining materials 30, 32 restrict the expansion of the air bag body 14 in the transverse direction of the vehicle. Accordingly, it ensures the expansion of the air bag body 14 elongatedly along the vertical direction of the vehicle. Gas flow gaps are provided between both ends of the retaining materials 30, 32 in the longitudinal direction of the vehicle and the inner walls 14C, 14B of the air bag body 14. The gas can be supplied through the gaps toward an end of the air bag body 14 at the upper side of the vehicle.

In the air bag body 14, the opening portion 15 has a peripheral edge 14A (shown in FIG. 3) which contacts the base plate 21 on the front-seat passenger side. A reinforcing material 22 and the reinforcing material 34 are respectively superposed on the peripheral edge 14A. The reinforcing material 22, and reinforcing material 34 are provided in a rectangular form, and are respectively provided with opening portions coaxially with the opening portion 15 shown in FIG. 1. The inflator 20 passes through these opening portions. It must be noted that the form of the reinforcing material 22, and reinforcing material 34 is not limited to being rectangular. It may be circular. The reinforcing material 22 has its entire outer peripheral portion more outwardly extended than an outer periphery of the base plate 21. Also, the reinforcing material 34 is larger in size than the reinforcing material 22 so that it entire outer peripheral portion more outwardly extended than an outer periphery of the reinforcing material 22. The reinforcing material 34, the reinforcing material 22, the air bag body 14 and the base plate 21 are secured by passing rivets 40 therethrough respectively.

The air bag body 14 and the reinforcing material 22 are sewn together outside the outer periphery of the base plate 21 at a sewing portion 22A. Therefore, it is possible to distribute the tensile strength applied to the boundary portion 14D between the peripheral edge 14A and the free extending position by using the reinforcing material 22. The peripheral edge 14A of the air bag body 14 restrictively extends when the air bag body 14 is expanded, and the free extending position is positioned on the outside of the base plate 21. As a result, the tensile strength applied to the boundary portion 14D is half the tensile strength at a time when there is no reinforcing material On the other hand, the air bag body 14 and the reinforcing material 34 are sewn along the outer periphery of the base plate 21 at a sewing portion 34A disposed on the outside of base plate 21 with respect to the sewing portion 22A. Accordingly, the tensile strength applied to the boundary portion 14D can be distributed by the reinforcing material 34. The tensile strength applied to the boundary portion 14D is equal to one-fourth of the tensile strength when there is no reinforcing material 22 and reinforcing material 34.

Figure 3:
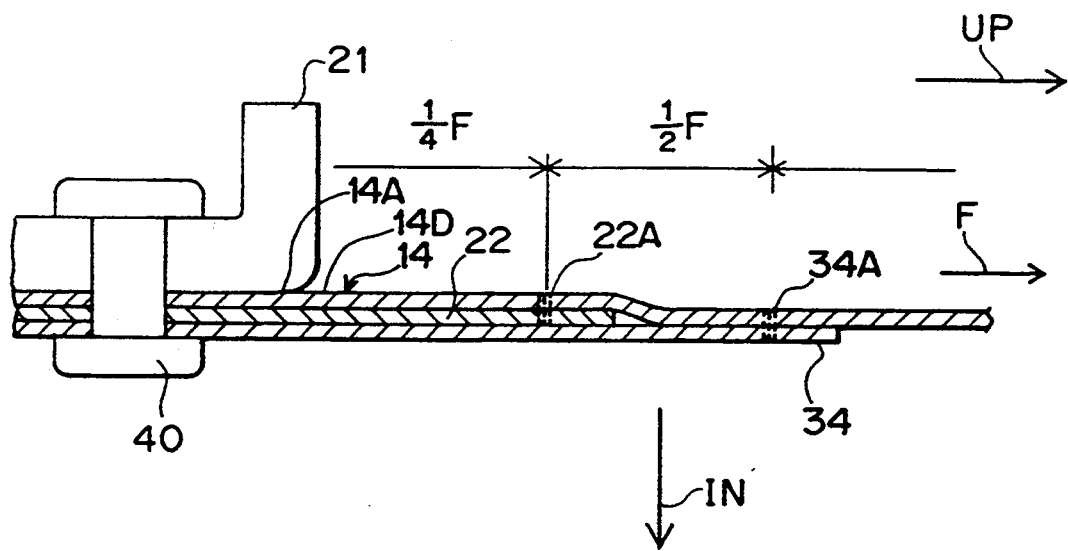
FIG. 3 is a sectional view of a mounting portion of the air bag apparatus of the present invention.

That is, when tensile strength F is applied to the air bag body 14 as shown in FIG. 3, strength exerted between the sewing portion 22A and the sewing portion 34A is equal to $(\frac{1}{2}) \times F$, and the strength exerted between the boundary portion 14D and the sewing portion 22A is equal to $(\frac{1}{4}) \times F$.

In the prior art, the reinforcing material 22 and the reinforcing material 34 are sewn together at the same position of the bag body so that the strength F is uniformly distributed to the bag body 14, the reinforcing material 22 and the reinforcing material 34. The resultant distributed strength is equal to $(\frac{1}{3}) \times F$. Compared with the present embodiment, the degree of distribution of the tensile strength by the reinforcing material is low.

A description will now be given of the operation of the embodiment.

In a normal condition of the vehicle, the starting system (not shown) is not activated so the air bag body 14 is not expanded.

On the other hand, if the side door 10 is deformed due to, for example, the collision of the vehicle, the starting system is activated. Thereafter, the gas generating material is burned, and the gas is supplied into the air bag body 14 so as to expand the air bag body 14. The air bag cover 24 is broken at the thin-walled portion 26 due to the pressure of the air bag body 14 and expands elongatedly from the thin-walled portion 26 along the vertical direction of the vehicle. Consequently, the air bag body 14 is interposed between the front-seat passenger and the side door 10.

The expansion of the air bag body 14 in the transverse direction of the vehicle is restricted by the retaining materials 30, 32. Hence, the air bag body 14 can be surely expanded elongatedly along the vertical direction of the vehicle.

On the other hand, the peripheral edge 14A of the air bag body 14 is fixed on the base plate 21, so that extension is restricted. In contrast, the peripheral edge 14A of the air bag body 14 outer than the position fixed on the base plate 21 can extend freely. As a result, large tensile strength is applied to the boundary portion 14D. However, since the reinforcing material 22 is sewn on the air bag body 14, the tensile strength applied to the boundary portion 14D is divided and distributed as small tensile strength (i.e., half of the tensile strength at a time when there is no reinforcing material 22). In this way, the tensile strength applied to the boundary portion 14D can be reduced by sewing the reinforcing material 22 to the air bag body 14. In the present embodiment, however, another reinforcing material 34 is sewn to the air bag body 14 as set forth above so that the tensile strength applied to the boundary portion 14D is further divided and distributed into an even smaller tensile strength (i.e., one-fourth of the tensile strength when there are no reinforcing materials 22, 32). Accordingly, it is possible to reduce the tensile strength applied to the boundary portion 14D sufficiently when the air bag body 14 is expanded. Therefore, a sufficiently large amount of pressure from the gas can be set, and the air bag body 14 can be elongatedly expanded along the vertical direction of the vehicle of this so-called side collision-type air bag apparatus according to the present embodiment.

In the embodiment set forth hereinbefore, a description has been given of an air bag apparatus applied to the front-seat occupant. However, the air bag apparatus may be applied to the driver's seat or a back-seat as well.

Further, in the present embodiment, a description was given of a condition where the number of reinforcing materials were two. However, the present invention may use to three or more reinforcing materials. In this case, the tensile strength applied to the boundary portion 14D of the bag body 14 becomes $(\frac{1}{2}^N) \times F$, where N is the number of the reinforcing materials to be superposed. F is the tensile strength applied to the boundary portion 14D of the bag body 14 when there is no reinforcing material. Therefore, the tensile strength can be efficiently distributed by the reinforcing materials.

In the prior art, N reinforcing materials are sewn onto the same position (one point) of the bag body, and the tensile strength applied to the bag body is equal to $\{1/(N+1)\} \times F$. In the prior art, the degree of distribution of the tensile strength by the reinforcing materials is extremely low when compared with the present embodiment.

What is claimed is:

1. An air bag apparatus comprising:
   a gas generating means for generating a gas when a vehicle rapidly decelerates;
   a bag body having a bag body opening portion which communicates with said gas generating means to be operatively expanded by said gas generated from said gas generating means;
   a base member for holding a peripheral edge of said bag body opening portion; and
   a plurality of reinforcing materials having respectively different sizes and being superposed in a layer fashion on said peripheral edge of said bag body opening portion to reinforce said bag body, respective inner end portions of said bag body and of said plurality of reinforcing materials being held by said base member, said plurality of reinforcing materials being respectively and sequentially sewn onto said bag body at different portions in order of shorter length with said reinforcing materials in a state of contact with said bag body, each of said reinforcing materials being respectively and independently sewn only at a portion in the vicinity of an outer end thereof to said bag body opening portion, and none of said reinforcing materials being sewn to each other.

2. An air bag apparatus according to claim 1, wherein said plurality of reinforcing materials are respectively and sequentially superposed in order of shorter length on said bag body, and each of said reinforcing materials is respectively and independently sewn at a portion in the vicinity of an outer end thereof to said bag body opening portion.

3. An air bag apparatus according to claim 1, wherein said sewn portions are sewn at positions which become more distant from said bag body opening portion as respective surface areas of said plurality of reinforcing materials increase from said smallest area.

4. An air bag apparatus according to claim 1, wherein said plurality of reinforcing materials are superposed on an inner surface of said bag body.

5. An air bag apparatus according to claim 1, wherein said plurality of reinforcing materials respectively have reinforcing material opening portions, said reinforcing material opening portions are disposed coaxially with said bag body opening portion to communicate with said gas generating means.

6. An air bag apparatus according to claim 5, wherein each inner peripheral portion of said coaxially disposed opening portions of said bag body and said reinforcing material is respectively clamped and fixed to said base member.

7. An air bag apparatus according to claim 5, wherein a peripheral portion of said opening portion of said bag body and a peripheral portion of said reinforcing material opening portions provided to correspond to said peripheral portion of said bag body are clamped to said base member.

8. An air bag apparatus according to claim 1, wherein said plurality of reinforcing materials are respectively sewn to said bag body so that tensile strength f applied to a superposed portion provided for said bag body, which corresponds to a portion which all said plurality of reinforcing materials are superposed, satisfies the following equation:

$$f = (\tfrac{1}{2}^N) \times F$$

where F is an entire tensile strength applied to said bag body and said plurality of reinforcing materials, and N is the number of said plurality of reinforcing materials.

9. An air bag apparatus according to claim 1, wherein said bag body is provided to have one of a rectangular surface and a circular surface in opposing relationship to a passenger.

10. An air bag apparatus according to claim 1, wherein said bag body accommodates an a means for allowing said bag body to expand in an upward direction of said vehicle between a surface including said bag body opening portion and a surface opposite to said surface.

11. An air bag apparatus according to claim 1, wherein said air bag apparatus is provided on a side door of said vehicle to allow said bag body to expand inwardly toward the lateral side of an occupant in the transverse direction of the vehicle.

12. An air bag apparatus comprising:
an inflator for generating gas when a vehicle rapidly decelerates:
a bag body having a bag body opening portion which communicates with said inflator to be operatively expanded by said gas generated from said inflator;
a base plate for holding a peripheral edge portion of said bag body opening portion; and
a plurality of reinforcing materials each having a different size, and being sequentially superposed in a layer fashion on said peripheral edge of said bag body opening portion of said bag body with said reinforcing material having the smallest area starting from an inner surface of said bag body so as to reinforce said bag body, one portion being held by said base plate, said plurality of reinforcing materials respectively including sewn portions in a vicinity of outer peripheries of said reinforcing materials, said sewn portion being sewn onto said bag body at different portions of said bag body such that said plurality of reinforcing materials are sequentially superposed on said bag body from said reinforcing material having the smallest area, said sewn portion being in a state of contact with said bag body at positions which become more distant from said bag body opening portion as respective surface areas of said plurality of reinforcing materials increase from said smallest area, each of said reinforcing materials being respectively and independently sewn only at a portion in the vicinity of an outer end thereof to said bag body opening portion, and none of said reinforcing materials being sewn to each other.

13. An air bag apparatus according to claim 12, wherein said plurality of reinforcing materials respectively have reinforcing material opening portions, said reinforcing material opening portions are disposed coaxially with said bag body opening portion so as to communicate with said inflator.

14. An air bag apparatus according to claim 13, wherein peripheral portions of said coaxially disposed opening portions of said bag body and said reinforcing material are clamped and fixed to said base member.

15. An air bag apparatus according to claim 13, wherein peripheral portions of said bag body opening portion and each peripheral portion of said reinforcing material opening portions are provided to correspond to each other and are clamped to said base member.

16. An air bag apparatus according to claim 12, wherein said plurality of reinforcing materials are respectively sewn to said bag body so that tensile strength f applied to a superposed portion provided for said bag body, which corresponds to a portion in which all said plurality of reinforcing materials are superposed, satisfies the following equation:

$$f = (\tfrac{1}{2}^N) \times F$$

where F is an entire tensile strength applied to said bag body and said plurality of reinforcing materials, and N is the number of said plurality of reinforcing materials.

17. An air bag apparatus according to claim 12, wherein said bag body is provided to have one of a rectangular surface and a circular surface in opposing relationship to a passenger.

18. An air bag apparatus according to claim 12, wherein said bag body accommodates an upward expansion allowing means for allowing said bag body to expand in an upward direction of said vehicle between a surface including said bag body opening portion and a surface opposite to said surface.

19. An air bag apparatus according to claim 12, wherein the longitudinal direction of said bag body is in the vertical direction of said vehicle, and said bag body is provided on a side door of said vehicle to allow said bag body to expand inwardly toward the lateral side of an occupant in the transverse direction of the vehicle.

* * * * *